(12) United States Patent
Briglia et al.

(10) Patent No.: US 9,285,163 B2
(45) Date of Patent: Mar. 15, 2016

(54) PROCESS AND APPARATUS FOR COOLING AND COMPRESSING A WET GAS RICH IN CARBON DIOXIDE

(75) Inventors: Alain Briglia, Hangzhou (CN); Philippe Court, Vincennes (FR); Arthur Darde, Paris (FR)

(73) Assignee: L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 116 days.

(21) Appl. No.: 14/131,931

(22) PCT Filed: Jun. 20, 2012

(86) PCT No.: PCT/FR2012/051385
§ 371 (c)(1),
(2), (4) Date: Jan. 10, 2014

(87) PCT Pub. No.: WO2013/014349
PCT Pub. Date: Jan. 31, 2013

(65) Prior Publication Data
US 2014/0137597 A1    May 22, 2014

(30) Foreign Application Priority Data
Jul. 25, 2011  (FR) ...................... 11 56759

(51) Int. Cl.
*F25J 1/00* (2006.01)
*B01D 53/14* (2006.01)
(Continued)

(52) U.S. Cl.
CPC ............. *F25J 1/0027* (2013.01); *B01D 53/263* (2013.01); *B01D 53/265* (2013.01); *F25J 3/0266* (2013.01);
(Continued)

(58) Field of Classification Search
CPC .................. B01D 2252/103; B01D 2252/2021; B01D 2252/2023; B01D 2256/22; B01D 2257/80; B01D 53/263; B01D 53/265; F25J 1/0027; F25J 2205/30; F25J 2205/40; F25J 2205/50; F25J 2210/70; F25J 2215/04; F25J 2220/80; F25J 2230/30; F25J 2240/30; F25J 2270/02; F25J 2270/80; F25J 3/0266
See application file for complete search history.

(56) References Cited

U.S. PATENT DOCUMENTS

2012/0272680 A1* 11/2012 Briglia et al. .................. 62/617

FOREIGN PATENT DOCUMENTS

EP   2335804 A1   6/2011
EP   2335806      6/2011
(Continued)

OTHER PUBLICATIONS

PCT/FR2012/051385, International Search Report and Written Opinion, Aug. 17, 2012.

*Primary Examiner* — Duane Smith
*Assistant Examiner* — Cabrena Holecek
(74) *Attorney, Agent, or Firm* — Justin K. Murray

(57) ABSTRACT

In a cooling and compressing process, a wet feed gas (1) that is rich in carbon dioxide is scrubbed with water and with an antifreeze agent in a column (3) in order to produce a flow of gas that is rich in carbon dioxide, water-depleted and cooled, the flow of gas rich in carbon dioxide is compressed in a compressor (20) and a liquid rich in carbon dioxide (18) is vaporized in order to cool the water and antifreeze agent before sending them to the scrubbing operation, it being possible for the liquid to originate from an external source.

9 Claims, 3 Drawing Sheets

(51) Int. Cl.
*B01D 53/26* (2006.01)
*F25J 3/02* (2006.01)

(52) U.S. Cl.
CPC ... *B01D 2252/103* (2013.01); *B01D 2252/2021* (2013.01); *B01D 2252/2023* (2013.01); *B01D 2256/22* (2013.01); *B01D 2257/80* (2013.01); *F25J 2205/30* (2013.01); *F25J 2205/40* (2013.01); *F25J 2205/50* (2013.01); *F25J 2210/70* (2013.01); *F25J 2215/04* (2013.01); *F25J 2220/80* (2013.01); *F25J 2230/30* (2013.01); *F25J 2240/30* (2013.01); *F25J 2270/02* (2013.01); *F25J 2270/80* (2013.01); *Y02C 10/12* (2013.01)

(56) References Cited

FOREIGN PATENT DOCUMENTS

FR            2954179 A1 *  6/2011
WO      2009127217 A1    10/2009

\* cited by examiner

PROCESS AND APPARATUS FOR COOLING AND COMPRESSING A WET GAS RICH IN CARBON DIOXIDE

CROSS REFERENCE TO RELATED APPLICATIONS

This application is a 371 of International PCT Application PCT/FR2012/051385, filed Jun. 20, 2012, which claims priority to French Application No. 1156759, filed Jul. 25, 2011, the entire contents of which are incorporated herein by reference.

BACKGROUND

This invention relates to a process and an apparatus for cooling and compressing a wet gas rich in carbon dioxide.

A gas rich in carbon dioxide in the context of this invention contains at least 80% mol. of carbon dioxide and even at least 90 mol. % of carbon dioxide.

A wet gas contains water.

As described previously, an innovative process, for compressing wet flows that are rich in $CO_2$, at reduced cost consists in cooling the gas before the compression in such a way as to condense a sufficient amount of water in order to prevent condensation in the compressor, which also prevents the phenomena of corrosion and which opens the way for using a compressor made of carbon steel or low-alloy steel. The presence of an antifreeze agent (methanol in particular) in the cooling water and the wet gas makes it possible to lower the temperature sufficiently before the compression by preventing the water still present from freezing.

The invention lends itself particularly well to the compression of flows devoid of NOx of which it is known that the interactions with methanol are of a nature as to destroy the latter.

When the fluid to be treated is in addition $CO_2$ that is practically pure but wet, a notable improvement can further be made to the system. This entails mixing the vaporised $CO_2$ in order to cool the water and methanol loop with the fluid cooled as such. When the source of wet $CO_2$ is located far away (at least 50 meters away for example) from the $CO_2$ compressor making it possible to convey the vaporised $CO_2$ at the condensation pressure (between 50 and 100 bars a in general, according to the temperatures of the cooling water available), this solution makes it possible to reduce the number of transfer lines between the different units.

As such, if the apparatus treats several sources of $CO_2$, of which at least one is a source of wet $CO_2$ but quasi-pure ($CO_2$ content>98% on a dry basis for example), for example originating from the scrubbing with amines located several hundred meters or kilometers away, it is sufficient to convey liquid $CO_2$ (via pipes or via lorry by providing for regular fillings) from these remote sources. The vaporised $CO_2$ can be mixed with the compressed $CO_2$ before it is transferred via pipes to the treatment unit downstream. Alternatively, the fraction of $CO_2$ can originate from the liquefier that is part of the apparatus, with a portion of the liquid produced being recycled in the form of liquid in order to cool the methanol via vaporisation.

The liquid $CO_2$, if it is conveyed via pipes, can either be conveyed at the condensation pressure and therefore at a temperature close to ambient temperature (pressure>60 bars), which reduces insulation costs, but which imposes a design pressure for the line that is clearly more substantial; or directly at the vaporisation pressure, taking account of pressure drop. As such, for a use around −20° C., the investment of a line operated at 20 bars (but having to be insulated as it is at −20° C.), is to be compared with a line that must not exceed 25° C. but containing gas at approximately 70 bars.

As a basic solution, it is recommended to not expand the liquid $CO_2$ after it is vaporised: it is then available around 20 bars, at a pressure suitable for the "local" transport of $CO_2$ which would originate from the compression unit of the wet gas.

It can also be considered to turbine the gas rich in carbon dioxide after it is vaporised before mixing it with the cooled gas, possibly at an inter-stage of the wet gas compressor.

It can also be considered to sub-cool the feed gas and/or the water-antifreeze agent mixture (for example methanol) with the turbined gas.

EP-A-2335804 and EP-A-2335806 disclose an apparatus according to the preamble of claim 6.

SUMMARY

According to an object of the invention, a method for cooling and compressing a gas rich in carbon dioxide is provided wherein:
i) a wet feed gas that is rich in carbon dioxide is cooled with water mixed with an antifreeze agent in a column in order to produce a flow of gas that is rich in carbon dioxide, water-depleted and cooled,
ii) the flow of gas rich in carbon dioxide is compressed in a compressor made of carbon steel or low-alloy steel and
iii) a liquid rich in carbon dioxide is used to cool the mixture of water and antifreeze agent before sending this mixture to the column for cooling the gas rich in carbon dioxide, it being possible for this liquid to originate from an external source and/or be constituted at least partially by the liquid produced by or derived from the liquefaction of the flow of gas rich in carbon dioxide compressed in the compressor.

According to other optional objects:
the compressor is made of carbon steel or low-alloy steel,
the flow of gas rich in carbon dioxide compressed in the compressor is liquefied, possibly after a step of purification, in order to form a liquid rich in carbon dioxide,
the liquid rich in carbon dioxide comes from an external source and a gas formed by vaporising the liquid is mixed with the gas rich in carbon dioxide upstream, downstream or in the compressor,
the liquid rich in carbon dioxide is vaporised by cooling the antifreeze agent,
the gas formed by the vaporisation is mixed with the flow of gas rich in carbon dioxide downstream or at an inter-stage of the compressor,
the gas formed by the vaporisation is expanded in a turbine, with the liquid being vaporised at between 10 and 125 bars abs, and even between 20 and 35 bars abs,
the gas expanded in the turbine is used to cool the feed gas and/or the mixture of water and antifreeze upstream of the cooling column and/or to cool the liquid rich in carbon dioxide.

According to another object of the invention, an apparatus is provided for cooling and compressing a gas rich in carbon dioxide comprising a column for cooling with water to which an antifreeze agent has been added, a wet feed gas that is rich in carbon dioxide in order to produce a flow of gas rich in carbon dioxide, water-depleted and cooled, a compressor, a duct for sending the flow of gas rich in carbon dioxide from the column to the compressor, a heat exchanger, a duct for sending the water and antifreeze agent mixture to the heat exchanger upstream of the column, a duct for sending a liquid rich in carbon dioxide to the exchanger in order to cool the water and the antifreeze agent, this liquid originating from an external source and/or being constituted at least partially by a portion of the gaseous carbon dioxide that is compressed and then liquefied, characterised in that it comprises means for sending a gas formed in the exchanger by the vaporisation of the liquid rich in carbon dioxide and means for mixing it with the flow of gas rich in carbon dioxide downstream or at an inter-stage of the compressor, The apparatus possibly comprises:
means for liquefaction and possibly means for purification, connected to the discharge of the compressor in order to form a liquid rich in carbon dioxide,
a duct for sending a gas, formed in the exchanger by the vaporisation of the liquid rich in carbon dioxide, at the head of the column,
a turbine for expanding the gas formed by the vaporisation of the liquid rich in carbon dioxide.

The invention also relates to an installation for the liquefaction of gas rich in carbon dioxide comprising an apparatus such as described hereinabove and at least one means for the liquefaction of gas rich in carbon dioxide, with this means being connected to the exchanger.

BRIEF DESCRIPTION OF THE DRAWINGS

The invention shall be described in more detail by referring to the figure that shows an apparatus according to an embodiment of the invention.

DETAILED DESCRIPTION OF THE INVENTION

Figure 1:
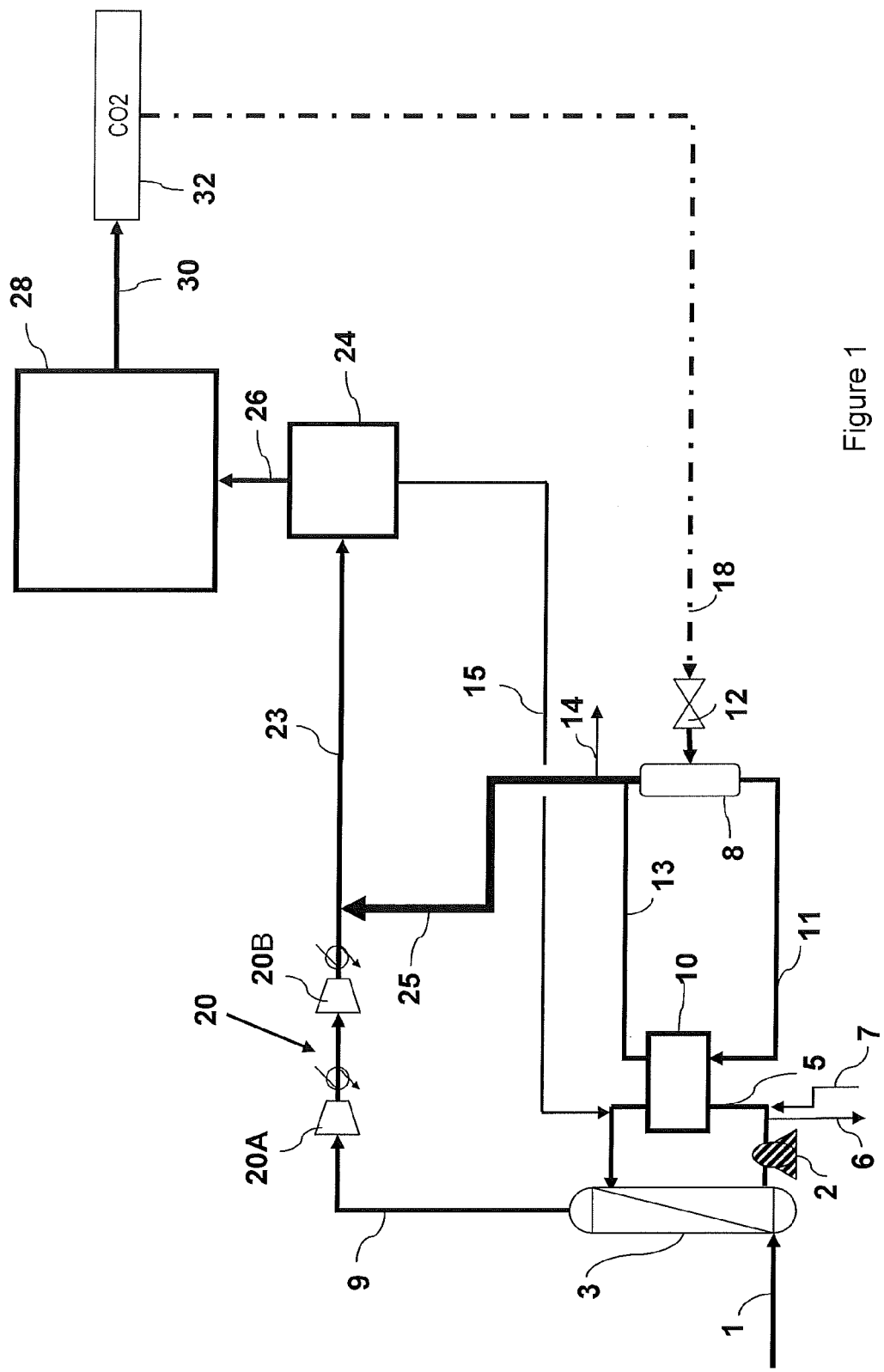
FIG. 1 provides an embodiment of the present invention.

In FIG. 1, a fluid 1 that is rich in $CO_2$ and wet is sent to a column 3 for scrubbing with water and with an antifreeze product, for example methanol, operating at a pressure less than 10 bars, preferably at atmospheric pressure. The water is extracted at the tank of the column 3, pumped by a pump 2 and divided into two. A portion 6 is used as a purge and the remainder 5 is cooled in the exchanger 10 faced with a vaporisation of liquid $CO_2$ 11. The cooled liquid 5 receives the recycling of the water and methanol 15 separated downstream of the compressor 20 (shown as multi-staged in the figures with two stages 20A, 20B) then is injected at the head of the column 3 in order to cool the wet $CO_2$. In doing so, the water content of this $CO_2$ is lowered in such a way that there is no longer any condensation in the compressor 20 which could then be made of carbon steel or low-alloy steel A gas 9 containing approximately 1500 ppm water and methanol exits at the head of the column 3, is compressed in the compressor 20 made of carbon steel or low-alloy steel. The compressed gas 23 is sent to a unit 24 for recovering and for recycling methanol and water. The methanol and the water driven are separated in the unit 24, possibly by scrubbing with liquid $CO_2$, and recycled in the fluid 5 via the flow 15. Any methanol that is lost in the system by the purges or the gaseous production is compensated via the line 7 and mixed with the flow 5.

Then possibly follows a liquefaction of the final product rich in $CO_2$ in the unit for liquefaction 28 in order to make it available to a transport member (via pipes or boat) or for its use in a method and possibly an optional purification of the gas rich in $CO_2$ of its light components (oxygen, argon, hydrogen, carbon monoxide, nitrogen, etc.) and/or of its heavier components ($NO_2$, $N_2O_4$, $SO_2$, methanol, water, etc.). The possible alternatives of this step are described abundantly in the previous patent applications. Possibly a step of compression of the final product rich in $CO_2$ can be present. The purified $CO_2$ 26 originating from the unit 24, in the case shown, is sent to the unit 28 in order to produce liquid $CO_2$ 30 which is then itself sent to storage 32.

In order to cool the water-antifreeze mixture in the exchanger 10, two solutions are possible. The most widely known is to use a cold unit on the site, which requires having additional means for compression, of which stopping would disturb the operation of the unit. The invention consists of reducing the impact of the need for cold in the exchanger 10 on the availability of the $CO_2$ compressed by the system.

As such a liquid rich in carbon dioxide 18 is conveyed at a high pressure (for example at more than 15 bars abs, and even at more than 50 bars abs, ranging up to 125 bars abs). It originates from an external source or preferably from the unit for liquefaction 28 treating the $CO_2$ compressed in the compressor 20, for example via pipes or delivered by lorry.

Figure 2:
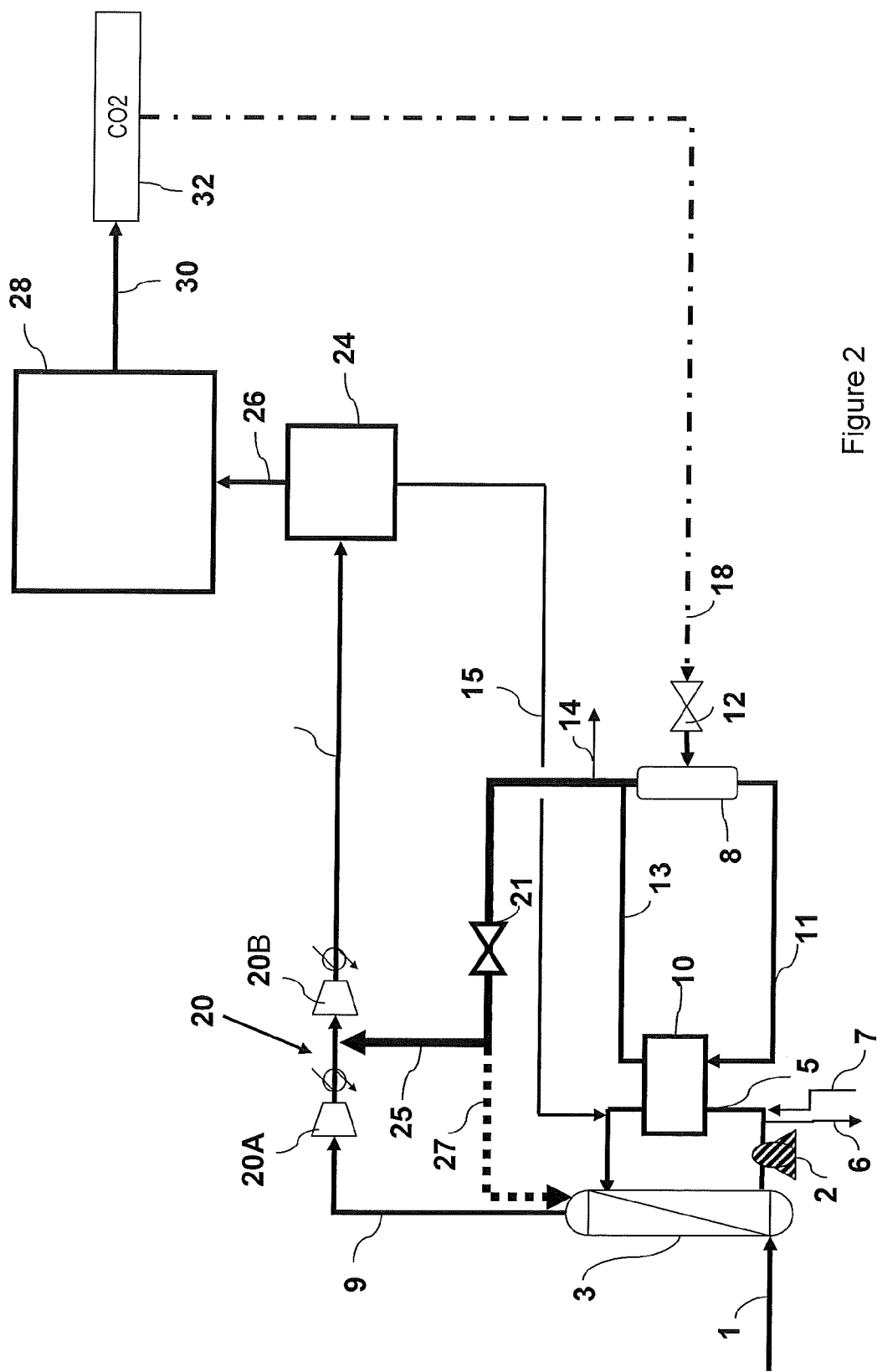
FIG. 2 provides another embodiment of the present invention.
Figure 3:
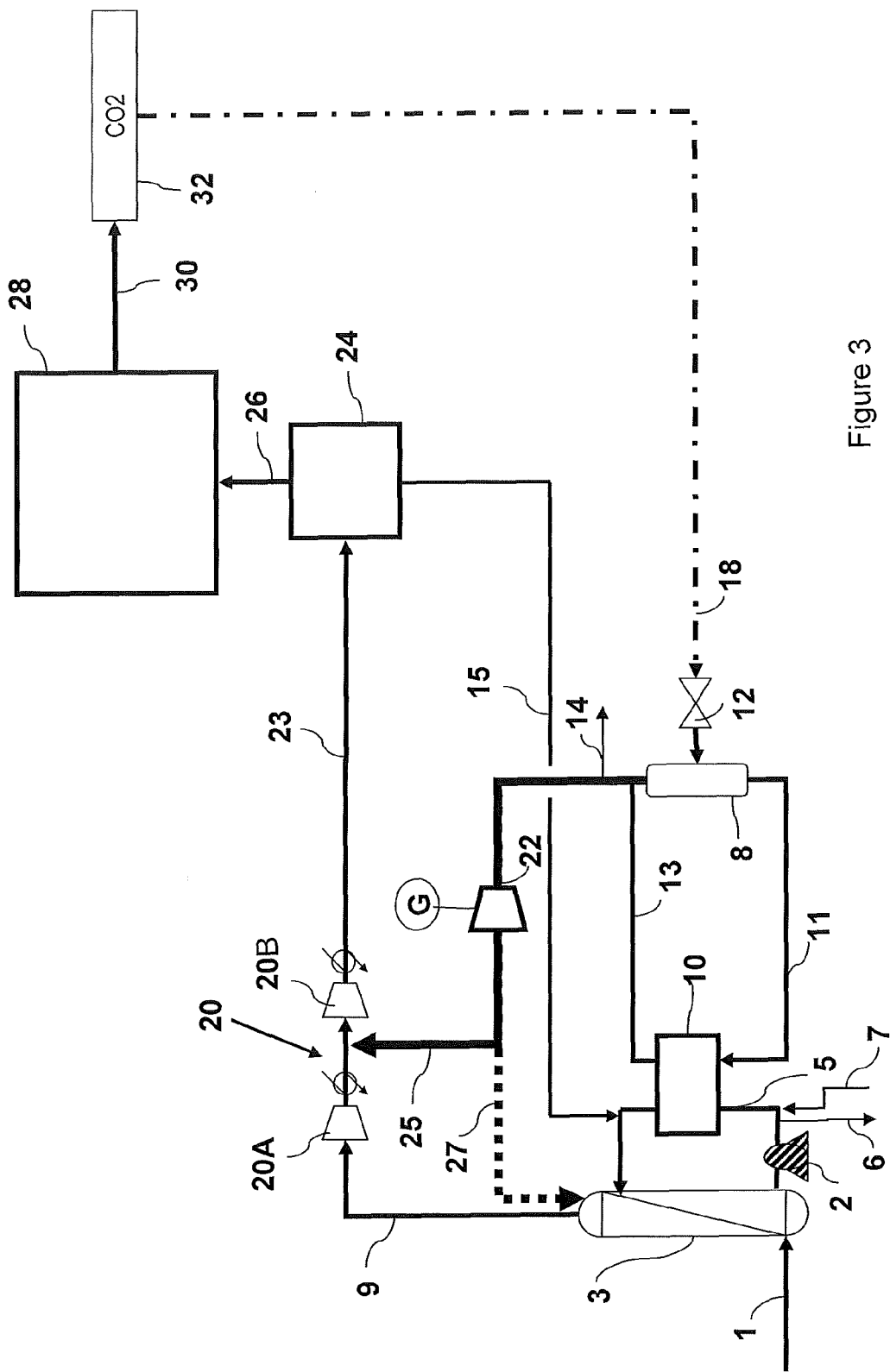
FIG. 3 provides yet anothed embodiment of the present invention.

The liquid 18 rich in carbon dioxide is expanded in the valve 12 and is sent to a phase separator 8. The liquid 11 from the phase separator 8 is vaporised in the exchanger 10 at between 10 and 125 bars abs, and even between 20 and 35 bars abs in order to form a gas 13. The gas 13 is mixed with the gas originating from the phase separator 8. This gas 13 is under pressure at between 10 and 125 bars abs, and even between 20 and 35 bars abs and rich in carbon dioxide can constitute a product 14 of the installation or otherwise be sent to the column head by the duct 27 or mixed with the gas 9 coming from the column. There are three possible ways shown for mixing the gas 13 with the gas 9 coming from the column: it can be mixed at the output or at an inter-stage of the compressor 20 if the pressures allow (there is then practically no loss of pressure energy of this fluid) via the duct 25 connected between the stages 20A, 20B, for example. It can also be expanded in a valve 21 (FIG. 2) or possibly a generating turbine 22 (FIG. 3) if the energy recovered justifies this investment.

The gas 13 and possibly the gas obtained after expansion in the generating turbine 22 (FIG. 2) can be heated before mixing with the gas 9 in order to pre-cool the liquid 18 and/or the liquid 5 and/or the gas before the turbine 22. These heat exchanges aim to reduce the entropy losses of the system, but are not shown in the figures.

Other antifreeze agents can be used instead of methanol, for example glycol.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:
1. A process for cooling and compressing a gas rich in carbon dioxide comprising:
   i) cooling a mixture against a liquid rich in carbon dioxide, wherein the mixture comprises water and an antifreeze agent, wherein the liquid rich in carbon dioxide vaporizes to form a carbon dioxide rich gas:
   ii) cooling a wet feed gas, which is rich in carbon dioxide, with the mixture in a column in order to produce a flow of gas rich in carbon dioxide; and iii) compressing the flow of gas rich in carbon dioxide in a compressor; and iv) mixing the carbon dioxide rich gas formed in step i) with the flow of gas rich in carbon dioxide at a location that is selected from the group consisting of downstream the compressor, at an inter-stage of the compressor, at the head of the column, and combinations thereof, wherein the liquid rich in carbon dioxide originates from a source selected from the group consisting of an external source, a liquid produced by or derived from liquefaction of the flow of gas rich in carbon dioxide compressed in the compressor, and combinations thereof.

2. The process of claim 1, further comprising the step of expanding the carbon dioxide rich gas formed by the vaporization in a turbine, with the liquid rich in carbon dioxide being vaporized at a pressure between 10 and 125 bars abs.

3. The process of claim 2, wherein the vaporization of step iv) occurs at a pressure between 20 and 35 bars abs.

4. The process of claim 2, further comprising the step of using the carbon dioxide rich gas expanded in the turbine to cool a fluid selected from the group consisting of the wet feed gas upstream of the column, the mixture upstream of the column, the liquid rich in carbon dioxide, and combinations thereof.

5. An apparatus for cooling and compressing a gas rich in carbon dioxide, the apparatus comprising:
- a column configured to cool a mixture of water and an antifreeze agent, wherein the column is further configured to cool a wet feed gas that is rich in carbon dioxide in order to produce a flow of gas rich in carbon dioxide, wherein the flow of gas rich in carbon dioxide is also water-depleted and cooled as compared to the wet feed gas;
- a compressor;
- a duct configured to send the flow of gas rich in carbon dioxide from the column to the compressor such that the compressor is configured to compress the flow of gas rich in carbon dioxide;
- a heat exchanger;
- a duct configured to send the mixture of water and antifreeze agent to the heat exchanger upstream of the column;
- a duct configured to send a liquid rich in carbon dioxide to the heat exchanger in order to cool the mixture of water and antifreeze agent, wherein the liquid rich in carbon dioxide originates from a source selected from the group consisting of an external source, a liquid produced by or derived from liquefaction of the flow of gas rich in carbon dioxide compressed in the compressor, and combinations thereof;
- a means for sending a carbon dioxide rich gas formed in the heat exchanger via vaporization of the liquid rich in carbon dioxide and means for mixing the carbon dioxide rich gas formed in the heat exchanger with the flow of gas rich in carbon dioxide at a location that is selected from the group consisting of downstream the compressor, at an inter-stage of the compressor, at the head of the column, and combinations thereof.

6. The apparatus of claim 5 further comprising a duct configured to send the carbon dioxide rich gas; formed in the heat exchanger via vaporization of the liquid rich in carbon dioxide; to the head of the column.

7. The apparatus of claim 5, further comprising a turbine configured to expand the carbon dioxide rich gas formed by vaporization of the liquid rich in carbon dioxide.

8. The apparatus of claim 5, wherein the compressor is made of carbon steel or low-alloy steel.

9. An installation for liquefaction of a gas rich in carbon dioxide comprising an apparatus according claim 5 and at least one means for liquefying the gas rich in carbon dioxide, said means for liquefying the gas rich in carbon dioxide being fluidly connected to the heat exchanger.

* * * * *